(12) United States Patent
    Gattanini

(10) Patent No.: US 12,671,320 B2
(45) Date of Patent: Jun. 30, 2026

---

(54) LIMITING CIRCUIT FOR USE IN EXPLOSION PROTECTION ENVIRONMENTS

(71) Applicant: Pepperl+Fuchs SE, Mannheim (DE)

(72) Inventor: Carlo Gattanini, Mannheim (DE)

(73) Assignee: Pepperl+Fuchs SE, Mannheim (DE)

( * ) Notice: Subject to any disclaimer, the term of this patent is extended or adjusted under 35 U.S.C. 154(b) by 133 days.

(21) Appl. No.: 18/762,119

(22) Filed: Jul. 2, 2024

(65) Prior Publication Data

US 2025/0015711 A1     Jan. 9, 2025

(30) Foreign Application Priority Data

Jul. 3, 2023    (EP) .................................... 23183017

(51) Int. Cl.
    H02M 1/34        (2007.01)
    H02M 1/32        (2007.01)

(52) U.S. Cl.
    CPC ........... H02M 1/348 (2021.05); H02M 1/327 (2021.05)

(58) Field of Classification Search
    CPC ........ H02M 1/348; H02M 1/327; H02M 1/32; H02M 3/3353; H02H 9/02; H02H 9/042; H02H 9/041
    USPC .......................................................... 361/18
    See application file for complete search history.

(56) References Cited

U.S. PATENT DOCUMENTS 4,331,908 A * 5/1982 Rilly ...................... H04N 3/185
                                      315/411
4,412,265 A * 10/1983 Buuck .................... H02H 9/008
                                      361/18

5,585,991 A * 12/1996 Williams ............... H02H 9/042
                                      361/33
5,723,914 A * 3/1998 Nakayama .............. H02P 25/10
                                      307/130
5,751,530 A * 5/1998 Pelly ........................ H02H 3/00
                                      361/42
6,177,875 B1 * 1/2001 Bolda ................ G01R 19/1659
                                    361/18

(Continued)

FOREIGN PATENT DOCUMENTS

AU       2011214562 B2     8/2012

OTHER PUBLICATIONS

Extended European Search Report for European Patent Appl. No. 23183017.5, dated Jan. 8, 2024.

*Primary Examiner* — Dharti H Patel
(74) *Attorney, Agent, or Firm* — Andrus Intellectual Property Law, LLP

(57)               ABSTRACT

A limiting circuit, particularly for a power supply, includes a first reverse-polarized Zener diode connected and configured to limit a voltage between two output terminals depending on a first breakdown voltage, a second reverse-polarized Zener connected and configured to limit a voltage between two output terminals depending on a second breakdown voltage, a semiconductor switch coupled in series with the second Zener diode to open or close depending on a switching signal, a first shunt resistor coupled in a load path and with the first and second Zener diodes to carry the load current and the currents flowing through the first and second Zener diodes, and a comparating device configured to generate the switching signal depending on a voltage drop over the first shunt resistor.

9 Claims, 6 Drawing Sheets

(56) References Cited

U.S. PATENT DOCUMENTS

| | | | | |
|---|---|---|---|---|
| 7,800,878 | B2 * | 9/2010 | Komatsu | H03K 17/0822 |
| | | | | 361/84 |
| 7,835,119 | B2 * | 11/2010 | Florence | H02M 3/158 |
| | | | | 361/18 |
| 11,592,467 | B2 * | 2/2023 | Veil | G05B 19/0425 |
| 2002/0018330 | A1 * | 2/2002 | Bremond | H02H 5/042 |
| | | | | 361/103 |
| 2007/0247775 | A1 * | 10/2007 | Shibata | H02H 3/207 |
| | | | | 361/118 |
| 2008/0013231 | A1 * | 1/2008 | Bazzano | H10D 89/711 |
| | | | | 361/56 |
| 2008/0247110 | A1 * | 10/2008 | Yamamoto | H02H 3/24 |
| | | | | 361/92 |
| 2013/0027819 | A1 * | 1/2013 | Aronov | H02H 9/042 |
| | | | | 361/42 |
| 2013/0162175 | A1 * | 6/2013 | Kim | G09G 3/3225 |
| | | | | 315/307 |
| 2015/0003118 | A1 * | 1/2015 | Shin | H02M 1/36 |
| | | | | 363/21.12 |
| 2015/0108919 | A1 * | 4/2015 | Van Erp | H05B 45/46 |
| | | | | 315/294 |
| 2017/0005574 | A1 * | 1/2017 | Wyland | H02M 3/158 |
| 2017/0315573 | A1 * | 11/2017 | Bartalini | H01S 5/042 |
| 2019/0115745 | A1 | 4/2019 | Finis | |
| 2020/0389009 | A1 | 12/2020 | Troyer | |
| 2021/0385923 | A1 * | 12/2021 | Mao | H05B 45/3725 |
| 2022/0149736 | A1 * | 5/2022 | Warnes | H02M 3/156 |
| 2022/0271670 | A1 * | 8/2022 | Song | H02M 1/36 |
| 2025/0015711 | A1 * | 1/2025 | Gattanini | H02M 1/327 |
| 2025/0192600 | A1 * | 6/2025 | Baranwal | H02J 7/345 |

* cited by examiner

LIMITING CIRCUIT FOR USE IN EXPLOSION PROTECTION ENVIRONMENTS

CROSS-REFERENCE TO RELATED APPLICATIONS

This application claims priority to EP23183017.5, filed Jul. 3, 2023, which is incorporated herein by reference in its entirety.

TECHNICAL FIELD

The present invention relates to protection circuits for protection against overvoltage and overcurrents, particularly for explosion protection applications. The present invention further relates to measures to reduce the maximum power dissipation of such a limiting circuit.

TECHNICAL BACKGROUND

Limiting circuits are particularly required for explosion protection applications in accordance to the standards IEC 60079-0 and IEC 60079-11. Such limiting circuits must be rated to sustain a high-power dissipation even in case of faults. Usually, common circuits make use of high-power Zener diodes and high-power resistors that have a high volume and therefore occupy most of the available space in the device. Furthermore, the costs of these components are high. Particularly, for Zener diodes, a low availability and increased costs have recently been experienced.

Current solutions to reduce the power dissipation of a limiting circuit are based on the use of a crowbar voltage limiter which applies an SCR, a TRIAC and/or a thyristor, which have an avalanche behavior.

It is an object of the present invention to provide a limiting circuit in conformity with the standards required for explosion protection applications which have a substantially reduced maximum power dissipation.

SUMMARY OF THE INVENTION

This object has been achieved by the limiting circuit according to claim 1.

Further embodiments are indicated in the depending subclaims.

According to a first aspect, a limiting circuit particularly for a power supply is provided, comprising:
- a first reverse-polarized Zener diode connected and configured to limit a voltage between two output terminals depending on a first breakdown voltage;
- a second reverse-polarized Zener connected and configured to limit a voltage between two output terminals depending on a second breakdown voltage;
- a semiconductor switch coupled in series with the second Zener diode and configured to open or close depending on a switching signal;
- a first shunt resistor coupled in a load path and with the first and second Zener diodes to carry the load current and the currents flowing through the first and second Zener diodes;
- a comparating device configured to generate the switching signal depending on a voltage drop over the first shunt resistor.

In accordance with the standard IEC 60079-11, a Zener diode is used which guarantees a voltage limitation whose maximum value is defined by the nominal reverse voltage of the Zener diode and its tolerance. The maximum value of the voltage limitation of each Zener diode must be rated to dissipate 1.5 times the maximum power that can occur in case of a fault. The maximum power dissipation of the Zener diode is defined by the Zener voltage×1.7×the breaking current of a circuit breaker, which leads to the requirement of high-power Zener diodes with a power dissipation of usually 3 to 5 W.

Furthermore, according to the above standard, an output resistor which is connected in series to the circuit breaker must be rated to dissipate 1.5 times the maximum power that can appear in case of a fault. Typically, it is necessary to use high-power resistors with a power rating of 3 to 5 W. To reduce the power ratings of the Zener diode and the output resistor, it was found that the maximum power dissipation depends directly on the maximum value of the voltage limitation. By reducing the maximum value, the current that flows either into the voltage limiting circuit portion and/or into the current limiting circuit portion can be reduced.

It may be provided that the limiting circuit is connected to input terminals of the power supply through a circuit breaker. Furthermore, the first Zener diode may be coupled in series with the first shunt resistor and the series connection of the semiconductor switch and the second Zener diode is coupled in parallel to the first Zener diode.

So, the above limiting circuit is basically connected to input terminals of a power supply through a circuit breaker and comprises a first reverse-polarized Zener diode and a second reverse-polarized Zener diode. The first Zener diode is in series with a shunt resistor and connected between the first and second input terminals via the circuit breaker. In parallel to the first Zener diode, a series connection of the second Zener diode and a semiconductor switch is provided. The semiconductor switch is normally open (high conductivity) and closes (low conductivity) depending on a switching signal (e.g. a switching voltage). The switching signal is generated depending on a node voltage on a node between the first Zener diode and the shunt resistor.

The Zener diodes are connected in reverse polarity so that they can basically limit the voltage to the intrinsic breakdown voltage. The switching of the switch is made depending on the result of a comparison in a comparating device which compares the node voltage of the node between the first Zener diode and the shunt resistor with a tripping voltage. If the node voltage exceeds or undergoes a given threshold voltage given as a tripping voltage, the comparating device makes the semiconductor switch to close (to become conductive) so that the second Zener diode is connected in parallel with the first Zener diode.

The breakdown voltage of the second Zener diode is set to be lower than the breakdown voltage of the first Zener diode so that the voltage over the Zener diodes is decreased as soon as the node voltage changes due to an excessive input voltage or if an excessive load current occurs.

The overvoltage protection is established by the Zener diodes. The overcurrent protection is provided so that when the current flowing through the shunt resistor results in a voltage drop over the shunt resistor to cause the node voltage to exceed or undergo the tripping voltage of the comparating device, the switching signal to close the semiconductor switch is generated. Typically, the comparating device switches, i.e. changes its output which controls the switch when the voltage at the node exceeds or undergoes the tripping voltage. The current tripping value corresponds to the trip voltage divided by the shunt resistance.

The general characteristics of the above circuitry for a voltage-current-relationship is an output voltage corresponding to the breakdown voltage of the first Zener diode for output currents from 0 to the current trip value defined by the shunt resistor and the comparating device and corresponding to the breakdown voltage of the second Zener diode for load currents above the current trip value. This results in the maximum power dissipation of the first Zener diode of the breakdown voltage times the current trip value and the maximum power dissipation of the second Zener diode of the breakdown voltage of the second Zener diode times 1.7 times the breaking current of the circuit breaker. The maximum power dissipation of the output resistor is either the output resistance times the current trip value squared or the breakdown voltage of the second Zener diode squared divided by the output resistance, whichever is larger.

The current trip value can be set between the maximum functional operating current required for the load and the nominal value of the circuit breaker. This allows to substantially reduce the maximum power dissipation of the limiting circuit.

The comparating device can be provided as a comparator with a set tripping voltage, wherein the switching signal is provided as a digital output signal of the comparator.

In an alternative embodiment, the comparating device can be provided by a bipolar transistor wherein the tripping voltage is defined by the forward bias necessary for the conduction of the current base-emitter path, which is typically 0.6 to 0.7 V at ambient temperature. As the basis emitter voltage is highly depending on the junction temperature, a temperature compensation using an NTC resistor with a negative temperature coefficient in parallel to the base-emitter path can be provided.

Another implementation of the comparating device is using a shunt voltage regulator, which has the advantage of being more precise and stable regarding the temperature, but usually has a higher tripping voltage of more than 1.2 V and is more expensive.

According to an embodiment, the first Zener diode may be in series with a second shunt resistor and the first shunt resistor, so that the load current only flows through the first shunt resistor and does not flow through the second shunt resistor, wherein the comparating device is connected to the node between the first Zener diode and the second shunt resistor. Here, the voltage is limited to a value which is defined by the breakdown voltage of the first Zener diode and the voltage drop over the second shunt resistor.

According to a further embodiment, the first Zener diode may be in series with a sixth resistor, wherein the node between the first Zener diode and the sixth resistor controls a transistor which is configured to drive a further semiconductor switch, particularly a MOSFET, the drain-source path of which is coupled between the input terminals.

Particularly, the series connection of the second Zener diode and the semiconductor switch is coupled to the node between the first Zener diode and the sixth resistor.

Furthermore, the further semiconductor switch is in series with a second shunt resistor and the first shunt resistor, so that the load current only flows through the first shunt resistor and does not flow through the second shunt resistor, wherein the comparating device is connected to the node between the first Zener diode and the second shunt resistor.

The proposed solutions involve the use of high-power Zener diodes. Due to a low spatial volume, a further adaptation of the above circuitry can be made to mimic the behavior of the Zener diodes by a simple replacement of the high-power Zener diodes as described before. The Zener diode can be replaced by a diode replacement circuit, which is connected at the terminal of the high-power Zener diodes. The diode replacement circuit comprises a further semiconductor switch, such as a MOSFET, a bipolar transistor, a first low-power Zener diode and a fifth and a sixth resistor. The further semiconductor switch simulates the current path through the replaced first Zener diode and is normally open. The further semiconductor switch will be closed as soon as a threshold voltage at the output terminals corresponding to the breakdown voltage of the mimicked Zener diode is exceeded. This is determined by a series connection of a sixth resistor and the first low-power Zener diode, wherein the node in between is coupled to a control input of the bipolar transistor whose basis-emitter path may be in parallel with the sixth resistor. The emitter-collector path of the bipolar transistor is in series with the fifth resistor, wherein the node in between is coupled with a control terminal of the further semiconductor switch.

The breakdown voltage of the high-power Zener diode is therefore replaced by a threshold voltage defined by the breakdown voltage of the first low-power Zener diode plus the base emitter voltage of the transistor. Once the output voltage exceeds the threshold voltage, the further semiconductor switch is driven to form a conductive path, as in the case of an overvoltage at the first high-power Zener diode.

The second low-power Zener diode is in series with the semiconductor switch and the third resistor, which already holds some voltage when the semiconductor switch is turned on so that the breakdown voltage of the second low-power Zener diode can be chosen to be significantly lower than that of the second high-power Zener diode. The power dissipation of this diode replacement circuit is mainly absorbed by the MOSFET.

To reduce the value of the output voltage for two different levels of the current trip value, a second low-impedance shunt resistor may be added in series with the source of the further semiconductor switch (MOSFET) of the diode replacement circuit where it is also connected to the input of the comparating device. The comparating device sees a voltage equal to the sum of a product of the resistance value of the first shunt resistor times the sum of the load current and the current through the further semiconductor switch, and the product of the shunt resistance of the second shunt resistor times the current through the further semiconductor switch.

From the equation, it is evident that the current coming from the voltage emitter has a greater influence compared to the current coming from the current limiter (IO). This condition permits to reduce the maximum power dissipation of the voltage limiter when the current coming from the voltage limiter is less than the current trip value. Basically, the resistance value of the second shunt resistor has to be very low, such as below 10Ω, so to avoid reducing the capacity of the voltage limiter to sustain a high surge current which is mainly drained by the high-power MOSFET.

BRIEF DESCRIPTION OF THE DRAWINGS

Embodiments are described in more detail in conjunction with the accompanying drawings, in which.

DESCRIPTION OF EMBODIMENTS

Figure 1:
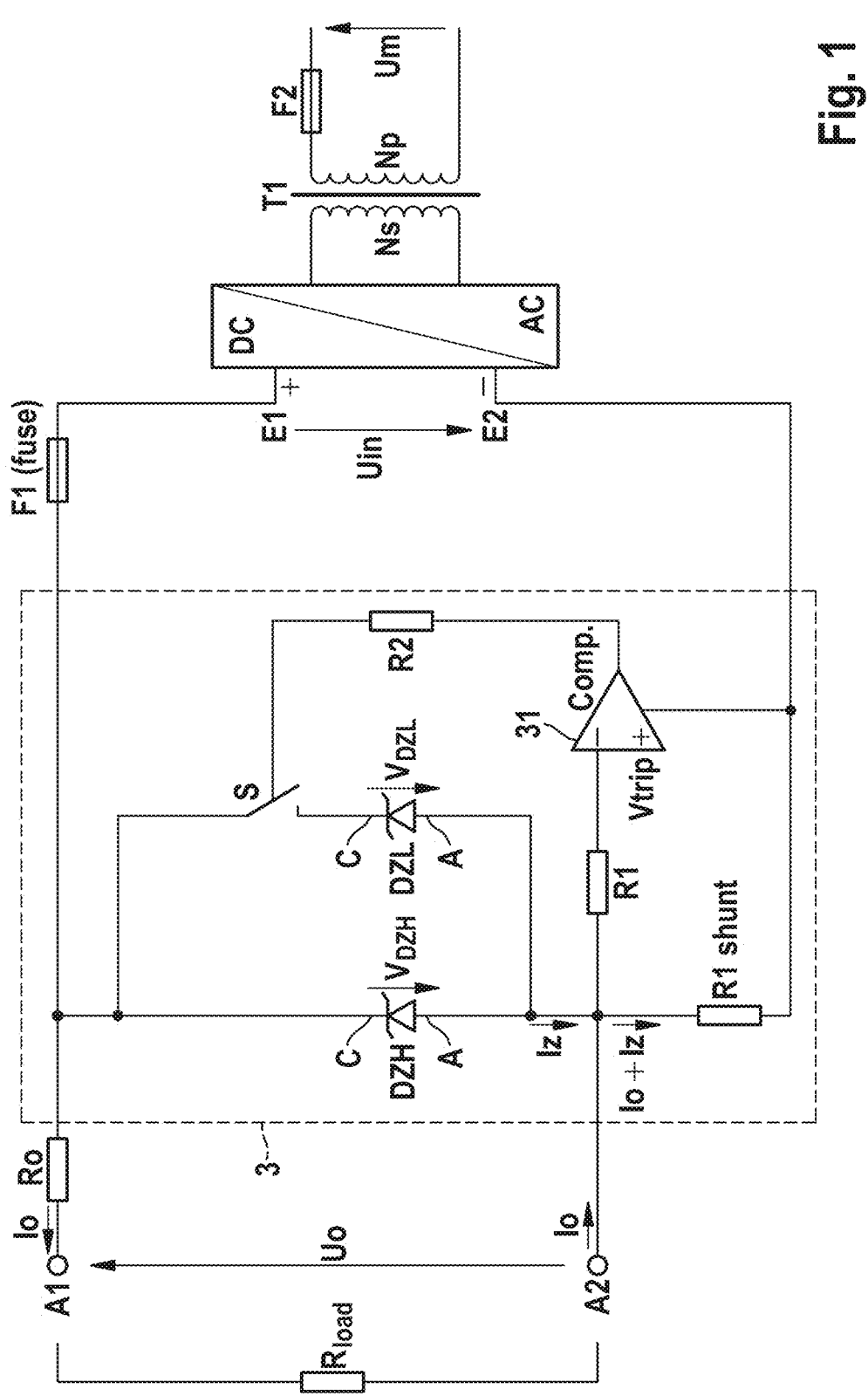
FIG. 1 schematically shows a basic circuitry of a limiting circuit.

FIG. 1 shows a schematic of the basic principle of the limiting circuit. FIG. 1 shows a power supply 1 having a transformator T1 and an AC/DC converter 2 to provide an input voltage $V_{in}$ between two input terminals E1, E2. The input voltage $V_{in}$ is used for driving a load $R_{load}$ between output terminals A1, A2. One input terminal E1 is provided with a circuit breaker F1, e.g. a fuse.

Furthermore, a limiting circuit 3 is provided basically between the input terminals E1, E2 at which the input voltage $V_{in}$ is applied. The circuit breaker F1 is connected between one input terminal E1 and the limiting circuit 3.

The limiting circuit 3 is described in more detail. A first high-power Zener diode DZH is provided in series with a first shunt resistor R1 shunt between the high potential input terminal E1 and the low potential input terminal E2. The first high-power Zener diode DZH is reversed polarized and connected so that the cathode is connected to the high potential input terminal E1. In parallel to the first high power Zener diode DZH, a series connection of semiconductor switch S and a second high-power Zener diode DZL is connected.

The switch S can be formed as a semiconductor switch such as by a MOSFET or the like, which is provided as normally open and can be controlled by a switching signal C of a comparator 31 as a comparating device. The switching signal C may be coupled to the switch S via a second resistor R2. An inverting input of the comparator 31 may be coupled via a high impedance first resistor R1 to the node between the first high-power Zener diode DZH and the first shunt resistor R1shunt. At the non-inverting input of the comparator 31 a fixedly set tripping voltage may be applied. The tripping voltage $V_{trip}$ may be set to $I_{trip} \times R1shunt$, wherein $I_{trip}$ may be set to be between the maximum functional operating current required for operating the load and the nominal value $I_{fuse}$ of the circuit breaker F1. $I_{fuse}$ is the breaking current of the circuit breaker F1.

The reverse breakdown voltage of the second high-power Zener diode DZL is chosen to be lower than the reverse breakdown voltage $V_{DZH}$ of the first high-power Zener diode DZH. Basically, the output voltage of the power supply 1 is firstly limited by the first high-power Zener diode DZH. For current limitation, the first shunt resistor R1shunt conducts the load current plus the voltage limiting current through the first and second high-power Zener diodes DZH, DZL. The currents flowing through the first resistor R1 and the second resistor R2 may be considered negligible due to their high impedance compared to the low impedance of the shunt resistor.

Figure 2:
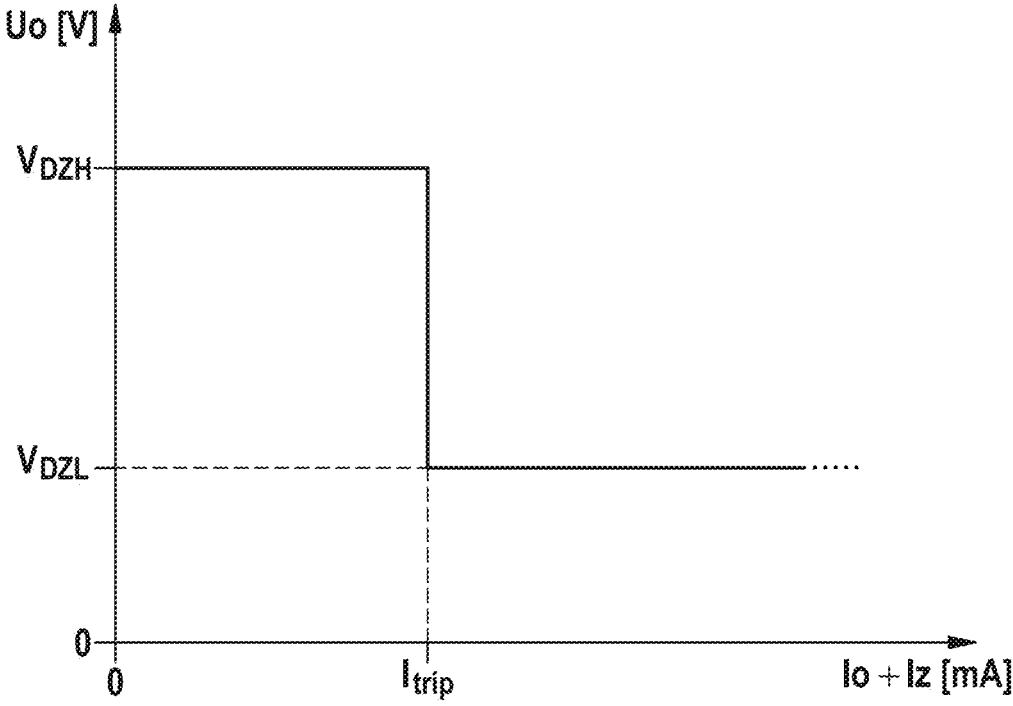
FIG. 2 the characteristics of the output voltage as a function of the sum of a voltage-limiting current and a load current.

FIG. 2 shows the behavior of the circuit of FIG. 1. FIG. 2 shows the voltage limitation of the output voltage $U_o$ as a function of the current through the first shunt resistor R1shunt which is the sum of the output current $I_o$ and the voltage limiting current $I_Z$ through the first high-power Zener diode DZH. It can be seen that the maximum power dissipation of the first high-power Zener diode DZH is the breakdown voltage $V_{DZH}$ of the first high-power Zener diode DZH times the trip current $I_{trip} = V_{trip}/R1shunt$ ($V_{DZH} \times I_{trip}$) while the maximum power dissipation of the second high-power Zener diode DZL corresponds to the breakdown voltage $V_{DZL}$ of the second high-power Zener diode DZL times 1.7 times the breaking current $I_{fuse}$ of the circuit breaker F1 ($V_{DZL} \times 1.7 \times I_{fuse}$).

Furthermore, an current-limiting resistor $R_O$ may be provided in series with the circuit breaker F1, wherein the limiting circuit is connected at a node between the output resistor $R_O$ and the circuit breaker. The maximum power dissipation of the output resistor is either $R_o \times I_{trip} \times I_{trip}$ Or $V_{DZL} \times V_{DZL}/R_O$, whichever is greater. The value of the trip current $I_{trip}$ can be set as the threshold value of the comparator 31 divided by the resistance value of the first shunt resistor R1shunt. The value of the trip current $I_{trip}$ can be set between the maximum functional operating current required for the load $R_{load}$ and the nominal value of the circuit breaker F1.

In FIG. 2, it can be seen that the maximum power dissipation of the limiting circuit 3 and of the current-limiting resistor $R_O$ can be considerably reduced compared to prior art solutions.

The circuit of FIG. 1 provides a voltage and current limitation. The voltage limitation is provided by the first high-power Zener diode DZH, which limits the voltage to the breakdown voltage of the first high-power Zener diode DZH. Current limitation is provided by the first shunt resistor R1shunt which is in the current path of the load $R_{load}$ and in the current path of the first high-power Zener diode DZH so that the combined current ($I_O + I_Z$) through the load in the first high-power Zener diode DZH exceeds the current trip value that the output of the comparator 31 switches the state thereby closing the switch S to connect the second high-power Zener diode DZL in parallel to the first high-power Zener diode DZH.

Figure 3:
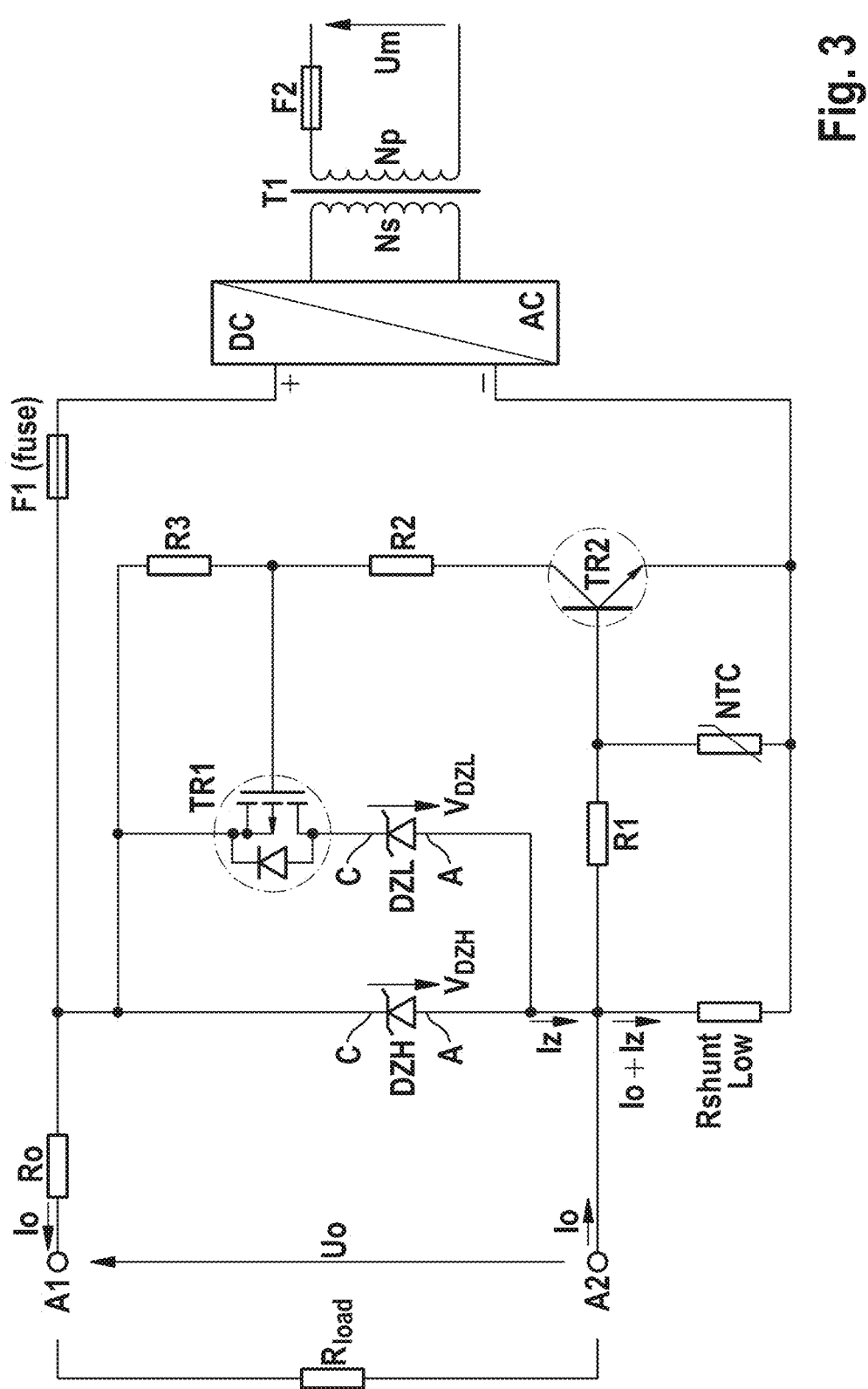
FIG. 3 a schematic of a further embodiment of the limiting circuit.

As shown in FIG. 3, the switch S can be realized by a P-MOSFET transistor TR1, which is connected with the comparator 31 via the second resistor R2. Accordingly, the drain-source path of the P-MOSFET is connected in series with the second high-power Zener diode DZL. The source terminal of the P-MOSFET and the gate terminal are interconnected with a third resistor R3 of high impedance of several kΩ.

Alternatively or additionally, also shown in FIG. 3, the comparator 31 can be realized by a bipolar NPN transistor TR2 wherein the trip voltage $V_{trip}$ is defined by the forward bias necessary for the conduction of the base-emitter path which is typically between 0.6 and 0.7 Volt at ambient temperature. As the base-emitter voltage is highly dependent on the junction temperature, it is convenient to connect a temperature compensation NTC resistor (NTC: negative temperature coefficient) between the base and emitter terminals of TR2. Therefore, the value of the first shunt resistor R1shunt has to be chosen as $R1shunt = 0.6V/(I_{trip})$.

Figure 4:
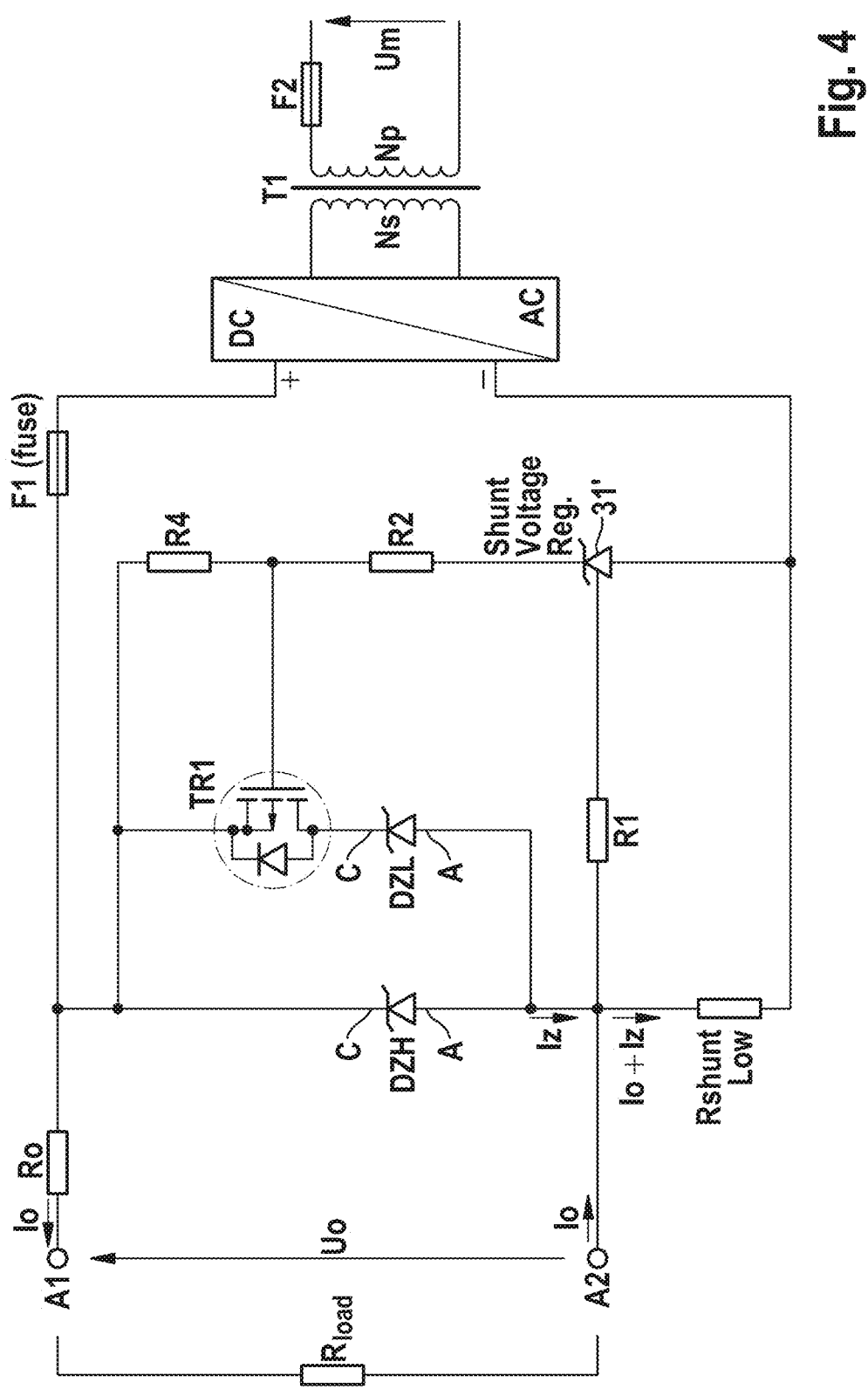
FIG. 4 a schematic of a further embodiment of the limiting circuit.

As shown in FIG. 4, the comparator 31 can be alternatively realized with a shunt voltage regulator 31' which has the advantage to being more precise and stable in temperature but provides a higher value of the trip voltage Vtrip, such as 1.2 Volt.

Figure 5:
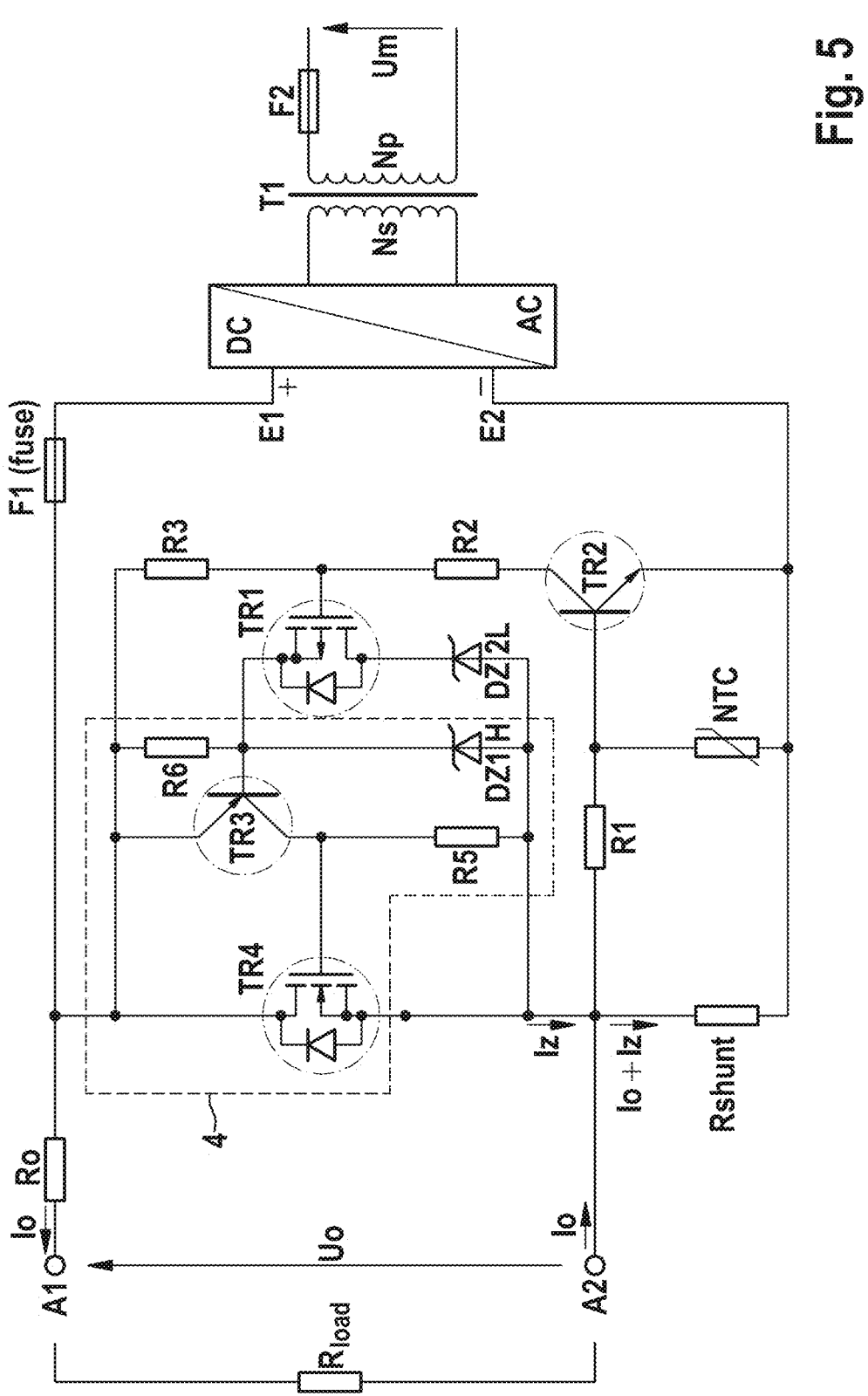
FIG. 5 a schematic of a further embodiment of the limiting circuit.

As high-power Zener diodes have a low availability, FIG. 5 shows an approach based on the embodiment of FIG. 3, where the function of the high-power Zener diode DZH is obtained by a sub-circuit 4 that provides the same electrical voltage limiting characteristics. The sub-circuit 4 mimics the behavior of the high-power Zener diode DZH and can be evaluated as a single component terminated by a cathode and an anode. The sub-circuit 4 may comprise of components of a first low-power Zener diode DZ1H, a high power N-MOSFET TR4, a fifth resistor R5, a sixth resistor R6, the semiconductor switch S, e.g. MOSFET, and a bipolar PNP transistor TR3. The breakdown voltage of the replaced high-power Zener diode is defined by the breakdown voltage of the low-power Zener diode DZ1H and the base emitter voltage of the bipolar PNP transistor TR3. The forward voltage of the high-power Zener diode DZ1H is defined by the body diode inherently part of the high-power N-MOS-FET TR4. The high-power dissipation is defined by the high-power N-MOSFET TR4 in accordance with its case, its mounting condition and its maximum junction temperature. The function is defined by the same components as described for the first high-power Zener diode DZH, thus the component of the second low-power Zener diode DZ2L and the p-MOSFET TR1 operating as the switch S.

In the circuit of FIG. 5, the drain terminal of the high-power MOSFET TR4 is connected with the input terminal E1 (via the circuit breaker F1), and the source terminal of the high-power MOSFET TR4 is connected with the second output terminal A2 at which the trip voltage $V_{trip}$ is provided. The emitter terminal of the bipolar PNP transistor TR3 is connected with the drain terminal of the N-MOSFET TR4, and the collector terminal is connected with the gate terminal of the N-MOSFET TR4. The gate terminal of the N-MOSFET is also connected with a fifth resistor to the second output terminal. The base terminal of the bipolar transistor TR3 is connected with the cathode of the first low-power Zener diode DZ1H. The anode of the first low power Zener diode DZ1H is connected with the second output terminal A2. The base terminal of the bipolar transistor TR3 is further connected with the source terminal of the P-MOSFET forming the switch S, while the drain terminal of the P-MOSFET is connected with a cathode of the second low-power Zener diode DZ2L. The anode of the second low-power Zener diode is also connected to the second output terminal A2. The source terminal of the P-MOSFET is connected with a sixth resistor with the base terminal of the transistor.

When the sum of the voltage limiting current and the load current is higher than the trip current value $I_{trip}$, the comparator 31, TR2, 31' drives the switch S, TR1 to activate the second low-power Zener diode DZ2L to reduce the output voltage $U_O$. The output voltage $U_O$ is now defined by the breakdown voltage of the second low-power Zener diode DZ2L and the base emitter voltage of the bipolar PNP transistor TR3.

Figure 6:
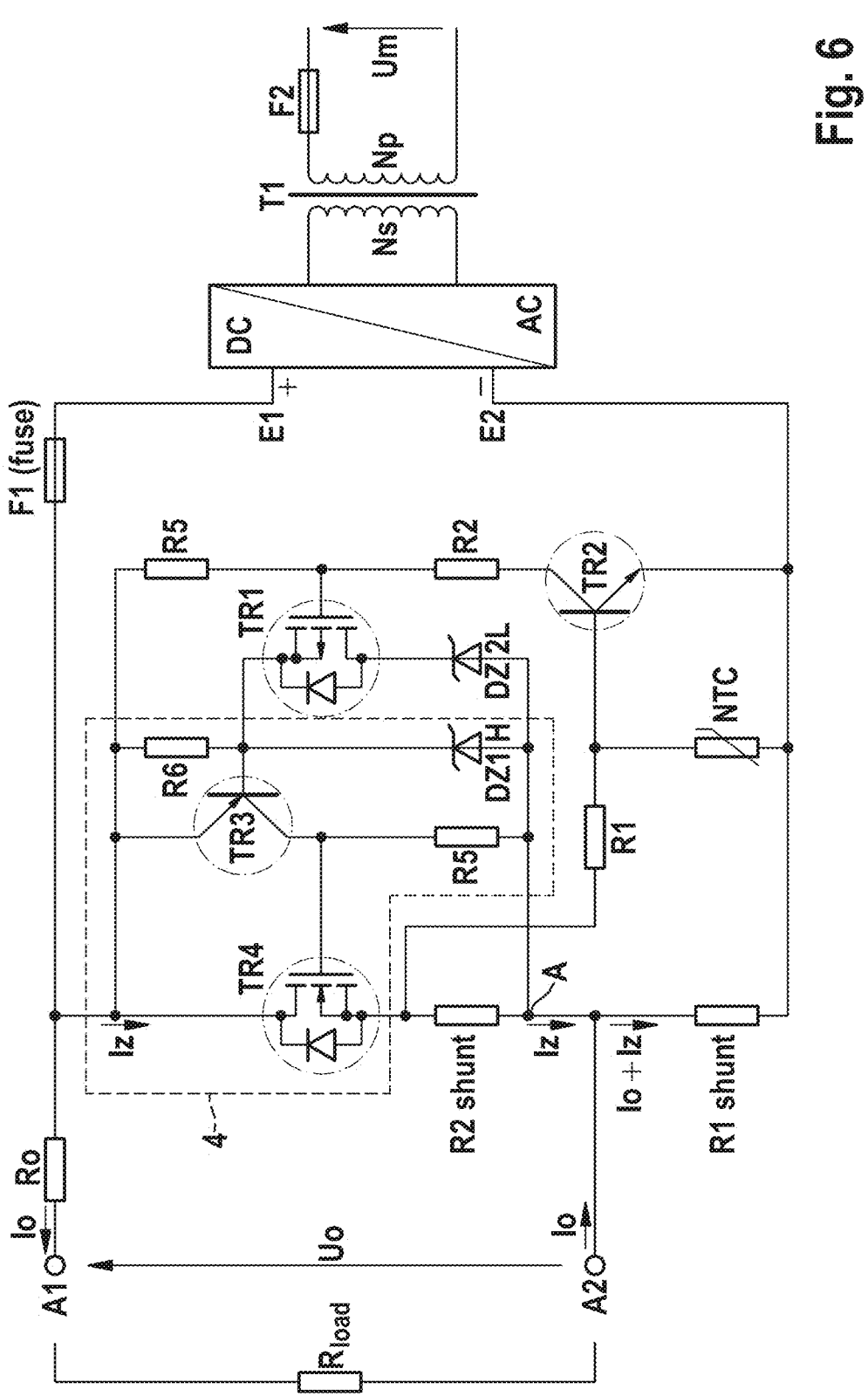
FIG. 6 a schematic of a further embodiment of the limiting circuit.

Furthermore, as shown in FIG. 6, the value of the output voltage $U_O$ can be furthermore reduced by two different levels for the trip current value. Here, a low-impedance second shunt resistor R2shunt can be connected in series to the source of the N-MOSFET TR4 so that the source terminal remains directly connected with the input of the comparating device 31, TR2, 31', i.e. that is the high-resistance first resistor R1. The comparating device 31, TR2, 31' sees an input voltage that is $V_{comp}$=R1shunt×$(I_o+I_z)$+R2×$I_z$. From this equation, it is evident that the current coming from the voltage limiting circuit has a greater influence compared to the current coming from the load $R_{load}$. This allows to further reduce the maximum power dissipation of the voltage limiting circuit when the voltage limiting current is less than the trip current value $I_{trip}$.

The invention claimed is:

1. A limiting circuit particularly for a power supply, comprising:
   a first reverse-polarized Zener diode connected and configured to limit a voltage between two output terminals depending on a first breakdown voltage;
   a second reverse-polarized Zener connected and configured to limit a voltage between two output terminals depending on a second breakdown voltage;
   a semiconductor switch coupled in series with the second Zener diode and configured to open or close depending on a switching signal;
   a first shunt resistor coupled in a load path and with the first and second Zener diodes to carry the load current and the currents flowing through the first and second Zener diodes; and
   a comparating device configured to generate the switching signal depending on a voltage drop over the first shunt resistor.

2. The limiting circuit according to claim 1 which is connected to input terminals of the power supply through a circuit breaker.

3. The limiting circuit according to claim 1, wherein the breakdown voltage of the second Zener diode is set to be lower than the breakdown voltage of the first Zener diode.

4. The limiting circuit according to claim 1, wherein the comparating device comprise a comparator, a bipolar transistor, particularly in conjunction with an NTC resistor for temperature compensation, or a shunt voltage regulator.

5. The limiting circuit according to claim 1, wherein the first Zener diode is coupled in series with the first shunt resistor and the series connection of the semiconductor switch and the second Zener diode is coupled in parallel to the first Zener diode.

6. The limiting circuit according to claim 1, wherein the first Zener diode is in series with a second shunt resistor and the first shunt resistor, so that the load current only flows through the first shunt resistor and does not flow through the second shunt resistor, wherein the comparating device is connected to the node between the first Zener diode and the second shunt resistor.

7. The limiting circuit according to claim 1, wherein the first Zener diode is in series with a sixth resistor, wherein the node between the first Zener diode and the sixth resistor controls a transistor which is configured to drive a further semiconductor switch, particularly a MOSFET, the drain-source path of which is coupled between the input terminals.

8. The limiting circuit according to claim 7, wherein the series connection of the second Zener diode and the semiconductor switch is coupled to the node between the first Zener diode and the sixth resistor.

9. The limiting circuit according to claim 7, wherein the further semiconductor switch is in series with a second shunt resistor and the first shunt resistor, so that the load current only flows through the first shunt resistor and does not flow through the second shunt resistor, wherein the comparating device is connected to the node between the first Zener diode and the second shunt resistor.

* * * * *